United States Patent
Spesser

(10) Patent No.: US 10,029,578 B2
(45) Date of Patent: Jul. 24, 2018

(54) METHOD AND APPARATUS FOR SETTING UP AN ON-BOARD CHARGER IN AN ELECTRICALLY DRIVEN VEHICLE

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 47 days.

(21) Appl. No.: 15/019,287

(22) Filed: Feb. 9, 2016

(65) Prior Publication Data
US 2016/0257213 A1 Sep. 8, 2016

(30) Foreign Application Priority Data
Mar. 5, 2015 (DE) .................. 10 2015 103 193

(51) Int. Cl.
*G05B 19/05* (2006.01)
*B60L 11/18* (2006.01)

(52) U.S. Cl.
CPC ....... *B60L 11/1838* (2013.01); *B60L 11/1816* (2013.01); *G05B 19/05* (2013.01); *B60L 2230/12* (2013.01); *G05B 2219/1215* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC .............. B60L 11/1838; B60L 11/1816; B60L 2230/12; G05B 19/05; G05B 2219/1215; Y02T 10/7005; Y02T 90/163; Y02T 90/121; Y02T 90/14; Y02T 90/128; Y02T 10/7088

USPC ............................................. 701/22
See application file for complete search history.

(56) References Cited

U.S. PATENT DOCUMENTS

| | | | |
|---|---|---|---|
| 2009/0146610 A1* | 6/2009 | Trigiani | H02J 7/0018 320/119 |
| 2011/0227534 A1* | 9/2011 | Mitsutani | B60K 6/445 320/109 |
| 2012/0038324 A1* | 2/2012 | Humphrey | B60L 3/0069 320/138 |
| 2012/0181983 A1 | 7/2012 | Khan et al. | |
| 2014/0001853 A1 | 1/2014 | Hanawa | |

FOREIGN PATENT DOCUMENTS

| | | |
|---|---|---|
| DE | 10 2011 017 567 | 2/2012 |
| DE | 10 2012 200 489 | 7/2012 |
| EP | 2 618 451 | 7/2013 |

OTHER PUBLICATIONS

German Search Report dated Aug. 31, 2015.

* cited by examiner

*Primary Examiner* — Redhwan K Mawari
*Assistant Examiner* — Rodney P King
(74) *Attorney, Agent, or Firm* — Gerald E. Hespos; Michael J. Porco; Matthew T. Hespos

(57) ABSTRACT

A method is provided for setting up an on-board charger in an electrically driven vehicle with the following features: a proxy resistor of a charging socket of the vehicle is queried (44, 68); if the proxy resistor is present (46), a master configuration (48, 50, 52) of the on-board charger is carried out; and if the proxy resistor is not present (70), a slave configuration (72, 74, 76) of the on-board charger is carried out.

19 Claims, 2 Drawing Sheets

METHOD AND APPARATUS FOR SETTING UP AN ON-BOARD CHARGER IN AN ELECTRICALLY DRIVEN VEHICLE

CROSS REFERENCE TO RELATED APPLICATION

This application claims priority under 35 USC 119 to German Patent Appl. No. 10 2015 103 193.0 filed on Mar. 5, 2015, the entire disclosure of which is incorporated herein by reference.

BACKGROUND

1. Field of the Invention

The invention relates to a method for setting up an on-board charger in an electrically driven vehicle. The invention also relates to a corresponding apparatus, a computer program and a storage medium.

2. Description of the Related Art

A plug-in vehicle is known in automotive technology as an electrically driven hybrid or electric vehicle with a traction battery that can be charged by an electrical connection to a stationary power supply system. A plurality of on-board chargers (OBC) may be arranged in such a vehicle for particularly rapid charging. In such a case, only one on-board charger is connected electrically to the charging socket of the vehicle and is connected logically as the "master," while the other (optional) on-board chargers are connected logically as "slaves" and are connected to the "master" only via a communication line.

EP 2 618 451 A2 discloses a charger network set up by a method that includes switching-on a charger that carries out a self-test. The charger communicates with the network via a communication means, sets itself as master and delivers energy to a battery pack.

DE 10 2012 200 489 A1 discloses a charging system for use in a vehicle for charging a vehicle battery with a first charging apparatus and a second charging apparatus. The charging apparatuses are connected to a vehicle bus. Each charging apparatus has a master display digital input and decodes the input to determine its role as the master charging apparatus or the slave charging apparatus. The master charging apparatus configures its connection to the vehicle bus so that a master node message record is used. The slave charging apparatus configures its connection to the vehicle bus so that a slave node message record is used.

DE 10 2011 017 567 A1 describes a twin charger system for charging a battery with current that is controlled by two chargers connected to the battery in a parallel configuration. One of the chargers is operated in accordance with a voltage control mode and the other charger is operated in accordance with a current control mode.

SUMMARY

The invention provides a method for setting up an on-board charger in an electrically driven vehicle, a corresponding apparatus, a corresponding computer program and a corresponding storage medium.

This approach is based on the fundamental idea of providing standard software for each on-board charger (that is to say for both the "master" and the "slave" at the same time). The software is adapted automatically the first time the vehicle is connected to the stationary power supply system. In this case, the on-board charger electrically connected to the charging socket of the vehicle is configured as the "master." Possibly additional on-board chargers that are not connected electrically to the charging socket are configured as "slaves" for communication with the "master", whereby the system is configured automatically for the corresponding charging power (for example 11 kW or 22 kW) depending on the number of on-board chargers in the vehicle.

This has the advantage that the software for the "master" and for the "slave" can be maintained uniformly, serviced and tested. Additionally, software must be installed only once during production of the vehicle.

Automatic configuration of the master or slave is provided by querying the proxy resistor of the charging socket. This proxy resistor usually is used to detect when a charging plug is plugged into the charging socket. The charging plug has a temporary resistor that is connected electrically in parallel with the proxy resistor and is evaluated using a logic unit in the on-board charger. A voltage can be detected using the logic unit in the on-board charger even if the charging plug has not been inserted, and that voltage can be used to detect the charging socket.

Provision also is made for the range of functions of the programmable logic controller (PLC) present as standard in an on-board charger to be activated only when the on-board charger is connected as the master. There is a saving in the quiescent current by deactivating the PLC functionality in on-board chargers connected as the slave.

One exemplary embodiment of the invention is illustrated in the drawings and is described in more detail below.

DETAILED DESCRIPTION

Figure 1:
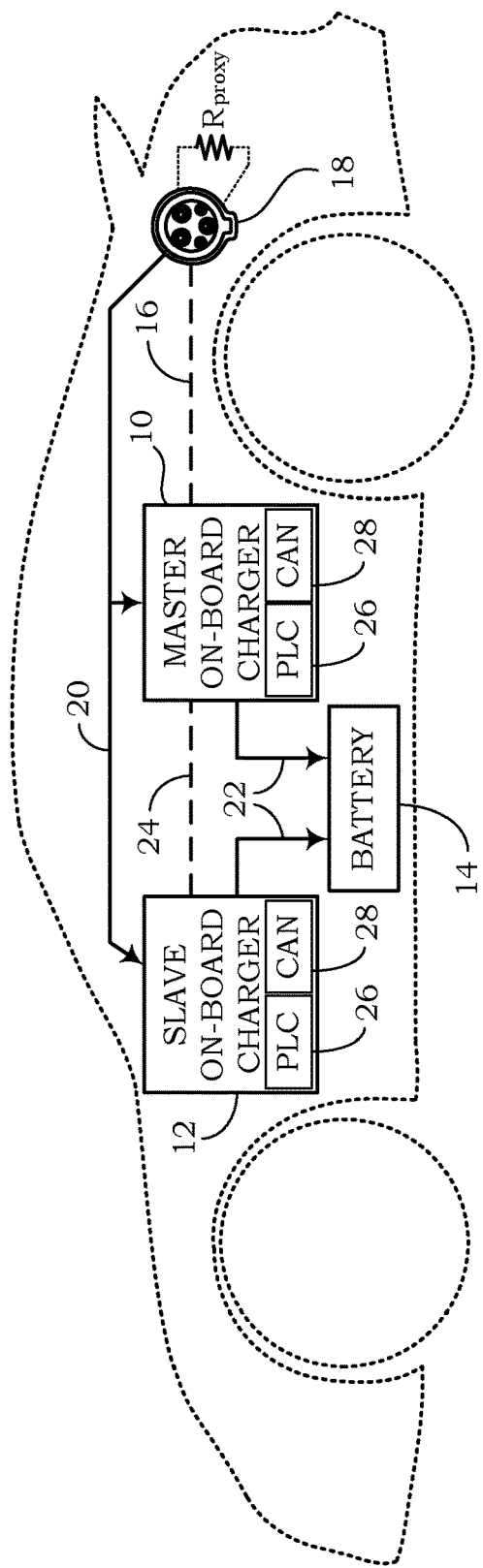
FIG. 1 shows the situation on which a method according to the invention is based.

FIG. 1 illustrates a vehicle with a master on-board charger 10 that connects to the entire charging socket peripherals 18 via a charging socket connection 16 and detects and deals with the entire insertion procedure. In contrast, a slave on-board charger 12 is only responsible for providing the additional power. The concept is offered to charge the traction battery 14 more quickly on public infrastructure. All relevant data for controlling the charging process are interchanged between the master 10 and the slave 12 via a communication path (controller area network, CAN) 24. The master on-board charger 10 is always connected to the charging socket 18 via the charging socket connection 16, whereas the slave 12 is connected only to the alternating current distribution 20, direct current distribution 22, and communication path 24 between the master 10 and the slave 12.

Figure 2:
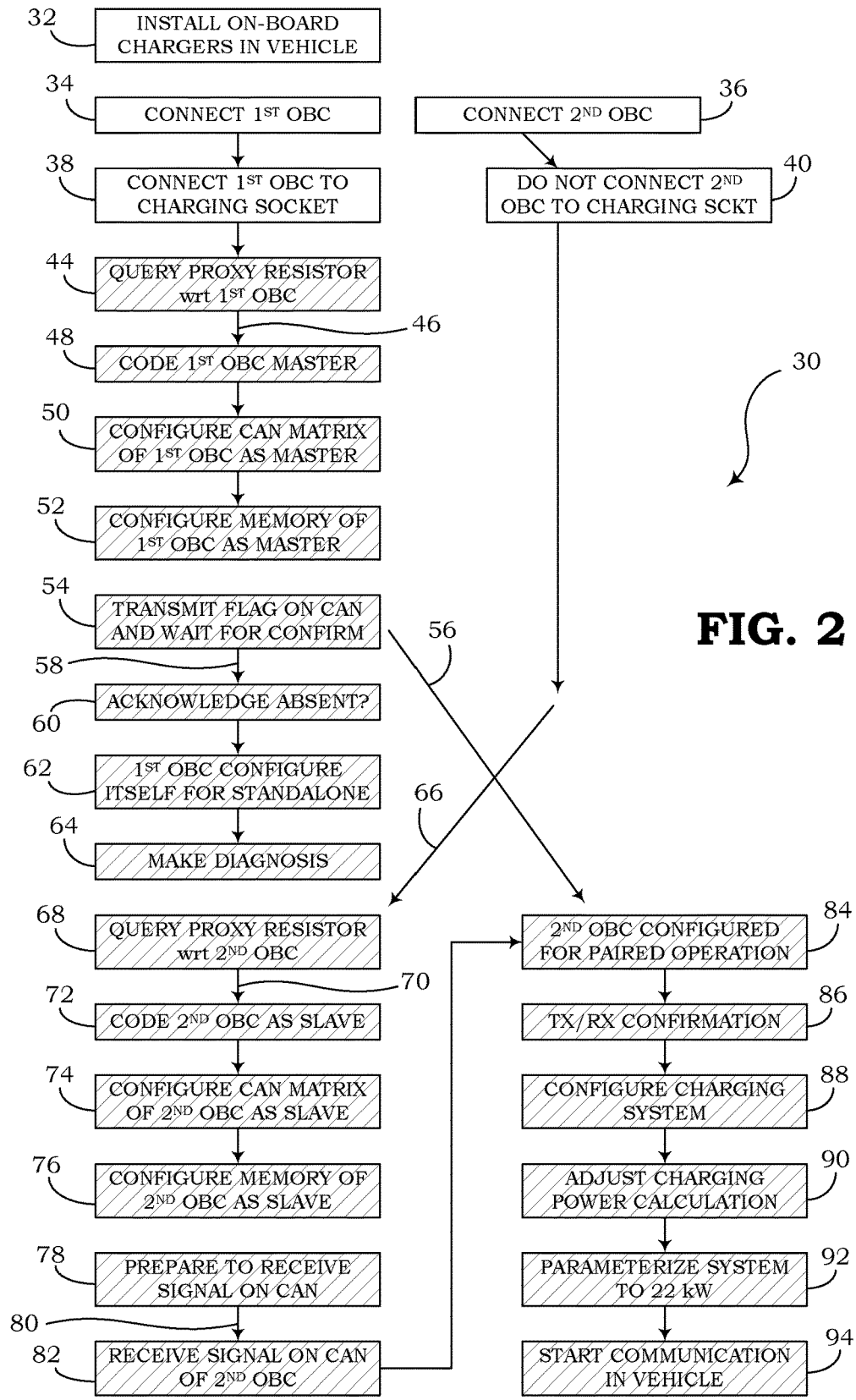
FIG. 2 is a simplified program flowchart of the method.

FIG. 2 illustrates, by way of example, the sequence of a method 30 according to the invention in the embodiment according to FIG. 1.

The starting point of the method 30 is formed by the installation (step 32) of the on-board chargers 10, 12 in the vehicle. The first on-board charger 10 is connected (step 34) to the charging socket 18, alternating current distribution 20, direct current distribution 22, and communication path 24. The second on-board charger 12 is connected (step 36) only to the alternating current distribution 20, direct current distribution 22, and communication path 24. The first on-board charger 10 is connected (step 38) to the charging socket 18, whereas the second on-board charger 12 is not connected (step 40), to the charging socket 18.

The steps illustrated in hatched form in FIG. 2 can be assigned to the learning phase of the underlying algorithm.

In the case of the first on-board charger 10, a proxy resistor ($R_{proxy}$) of the charging socket 18 initially is queried (step 44). Since the proxy resistor is present (step 46) or detectable from the perspective of the first on-board charger 10, the first on-board charger 10 is coded (step 48) as the master by virtue of its relevant programmable logic controller (PLC) 26 being activated. During this master configuration (steps 48, 50, 52), the first on-board charger 10, on the one hand, configures (step 50) a CAN matrix 28 stored in the first on-board charger 10 as master and therefore activates the instruction set for controlling the charging of the subsequent slave on-board charger 12. On the other hand, the first on-board charger 10 configures (step 52) its history memory as master, thus defining, inter alia, the conditions for a charging request of 22 kW by the first on-board charger 10.

After the described master configuration 48, 50, 52, the first on-board charger 10 transmits (step 54) a signal (flag) on the CAN 24 and waits for the relevant confirmation by the second on-board charger 12 provided as the slave for a predefined period (timeout 58), preferably in seconds. If the acknowledgement by the second on-board charger 12 were absent (step 60) over this period, the first on-board charger 10 would configure itself (step 62) for individual operation (standalone) with a total charging power of 11 kW and would make a corresponding diagnosis (step 64).

However, even the second on-board charger 12, which is not connected (66) to the charging socket 18, queries the proxy resistor $R_{proxy}$ (step 68). Since the proxy resistor is not present here or detectable from the perspective of the second on-board charger 12 (step 70), the second on-board charger 12 is configured as a slave (step 72) by virtue of the programmable logic controller, reserved only for the master 10, being deactivated.

During the slave configuration (steps 72, 74, 76), the second on-board charger 12 also configures the CAN matrix 28 (step 74) stored therein as slave and therefore activates the instruction set for controlling the charging by the master 10; it also configures (76) its history memory as slave, thus defining the conditions for a charging request of 22 kW by the second on-board charger 12.

After this slave configuration 72, 74, 76, the second on-board charger 12 gets ready to receive the signal on the CAN 24 (step 78). During the period predefined for this purpose (step 80), the second on-board charger 12 in the present scenario actually receives the signal (step 82), configures itself (step 84) for paired operation with a total charging power of 22 kW and transmits the relevant confirmation (step 86), via the CAN 24, to the master 10, which in turn receives the confirmation (step 86).

In view of the acknowledgement given, the first on-board charger 10 now configures the 22 kW charging system (step 88) in the vehicle, adjusts the charging power calculation to 22 kW (step 90), adaptively parameterizes the system automatically to 22 kW (step 92), starts communication in the vehicle (step 94) and stores all settings in the master 10 and in the slave on-board charger 12.

What is claimed is:

1. A method for configuring on-board chargers in an electrically-driven vehicle, the method comprising the steps of:

querying a proxy resistor of a charging socket of the vehicle to determine if the presence of the proxy resistor is detectable with respect to a first on-board chargers, the proxy resistor adapted for use to detect when a charging plug is attached to the charging socket of the vehicle for enabling electrical power to be delivered to the vehicle;

querying the proxy resistor to determine if the presence of the proxy resistor is detectable with respect to a second on-board charger, wherein the proxy resistor is configured such that the presence of the proxy resistor is detectable by one of the first on-board charger or the second on-board charger;

configuring the first on-board charger as a master on-board charger if the presence of the proxy resistor is detectable with respect to the first on-board charger; and configuring the second on-board charger as a slave on-board charger if the presence of the proxy resistor is not detectable with respect to the second on-board charger.

2. The method of claim 1, further comprising the steps of:
activating a first programmable logic controller (PLC) of the first on-board charger if the first on-board charger is configured as a master on-board charger; and
deactivating a second PLC of the second on-board charger if the second on-board charger is configured as a slave on-board charger.

3. The method of claim 1, further comprising the steps of:
configuring a first controller area network (CAN) matrix stored in the first on-board charger as a master;
configuring a second CAN matrix stored in the second on-board charger as a slave;
configuring a first memory of the first on-board charger as a master; and
configuring a second memory of the second on-board charger as a slave.

4. The method of claim 3, further comprising the steps of:
transmitting a control signal from the master on-board charger via a controller area network (CAN) to the slave on-board charger;
waiting for a confirmation signal from the slave on-board charger for a predefined period;
using the master on-board charger to configure itself for individual operation if the confirmation signal is not received after the predefined period; and
making a diagnosis during individual operation of the master on-board charger.

5. The method of claim 4, further comprising the steps of:
using the slave on-board charger to configure itself for paired operation if the slave on-board charger receives the control signal;
transmitting the confirmation signal from the slave on-board charger to the master on-board charger via the CAN;
receiving the confirmation signal by the master on-board charger; and
configuring the master on-board charger for paired operation.

6. The method of in claim 5, further comprising the steps of:
using the master on-board charger to adjust a charging power calculation to the paired operation after the master and slave on-board chargers have been configured for paired operation;
carrying out a parameterization process for the paired operation; and initiating a communication via the CAN and storing settings in the on-board chargers.

7. The method of claim 1, further comprising the steps of:
preparing the slave on-board charger to receive a signal via a controller area network (CAN) of the vehicle; and
waiting for a predefined period.

8. The method of claim 1, wherein the presence of the proxy resistor is detectable via a charging socket connection, the charging socket connection being between the first on-board charger or the second on-board charger and the charging socket.

9. The method of claim 8, wherein only one of the first on-board charger or the second on-board charger is connected to the charging socket.

10. An apparatus for configuring on-board chargers in an electrically-driven vehicle, the apparatus comprising:
means for querying a proxy resistor of a charging socket of the vehicle to determine if the presence of the proxy resistor is detectable with respect to a first on-board chargers, the proxy resistor adapted for use to detect when a charging plug is attached to the charging socket of the vehicle for enabling electrical power to be transferred from the charging plug to the charging socket;
means for querying the proxy resistor to determine if the presence of the proxy resistor is detectable with respect to a second on-board charger, wherein the proxy resistor is configured such that the presence of the proxy resistor is detectable by one of the first on-bard charger or the second on-board charger;
means for configuring the first on-board charger as a master on-board charger if the proxy resistor is detectable with respect to the first on-board charger; and
means for configuring the second on-board charger as a slave on-board charger if the proxy resistor is not detectable with respect to the second on-board charger.

11. The apparatus of claim 10, further comprising:
means for activating a first programmable logic controller (PLC) of the first on-board charger if the first on-board charger is configured as a master on-board charger; and
means for deactivating a second PLC of the second on-board charger if the second on-board charger is configured as a slave on-board charger.

12. The apparatus of claim 10, further comprising:
means for configuring a first controller area network (CAN) matrix stored in the first on-board charger as a master;
means for configuring a second CAN matrix stored in the second on-board charger as a slave;
means for configuring a first memory of the first on-board charger as a master; and
means for configuring a second memory of the second on-board charger as a slave.

13. A non-transitory machine-readable storage medium having a computer program for configuring on-board chargers in an electrically-driven vehicle, the storage medium comprising logic for:
querying a proxy resistor of a charging socket of the vehicle to determine if the presence of the proxy resistor is detectable with respect to a first on-board chargers, the proxy resistor adapted for use to detect when an external charging plug is attached to the charging socket of the vehicle to allow electrical power to be delivered to the vehicle;
querying the proxy resistor to determine if the presence of the proxy resistor is detectable with respect to a second on-board charger, wherein the proxy resistor is configured such that the presence of the proxy resistor is detectable by one of the first on-board charger or the second on-board charger;
configuring the first on-board charger as a master on-board charger if the proxy resistor is detectable with respect to the first on-board charger; and
configuring the second on-board charger as a slave on-board charger if the proxy resistor is not detectable with respect to the second on-board charger.

14. The non-transitory machine-readable storage medium of claim 13, further comprising logic for:
activating a first programmable logic controller (PLC) of the first on-board charger if the first on-board charger is configured as a master on-board charger; and
deactivating a second PLC of the second on-board charger if the second on-board charger is configured as a slave on-board charger.

15. The non-transitory machine-readable storage medium of claim 13, further comprising logic for:
configuring a first controller area network (CAN) matrix stored in the first on-board charger as a master;
configuring a second CAN matrix stored in the second on-board charger as a slave;
configuring a first memory of the first on-board charger as a master; and
configuring a second memory of the second on-board charger as a slave.

16. The non-transitory machine-readable storage medium of claim 15, further comprising logic for:
transmitting a control signal from the master on-board charger via a controller area network (CAN) to the slave on-board charger;
waiting for a confirmation signal from the slave on-board charger for a predefined period;
using the master on-board charger to configure itself for individual operation if the confirmation signal is not received after the predefined period; and
making a diagnosis during individual operation of the master on-board charger.

17. The non-transitory machine-readable storage medium of claim 16, further comprising logic for:
using the slave on-board charger to configure itself for paired operation if the slave on-board charger receives the control signal;
transmitting the confirmation signal from the slave on-board charger to the master on-board charger via the CAN;
receiving the confirmation signal by the master on-board charger; and
configuring the master on-board charger for paired operation.

18. The non-transitory machine-readable storage medium of in claim 17, further comprising logic for:
using the master on-board charger to adjust a charging power calculation to the paired operation after the master and slave on-board chargers have been configured for paired operation;
carrying out a parameterization process for the paired operation; and
initiating a communication via the CAN and storing settings in the on-board chargers.

19. The non-transitory machine-readable storage medium of claim 13, further comprising logic for:
preparing the slave on-board charger to receive a signal via a controller area network (CAN) of the vehicle; and
waiting for a predefined period.

\* \* \* \* \*